Aug. 30, 1932.  M. AFTERGUT  1,875,202
AUTOMATIC GLASS BLOWING MACHINE
Original Filed March 16, 1927  2 Sheets-Sheet 1
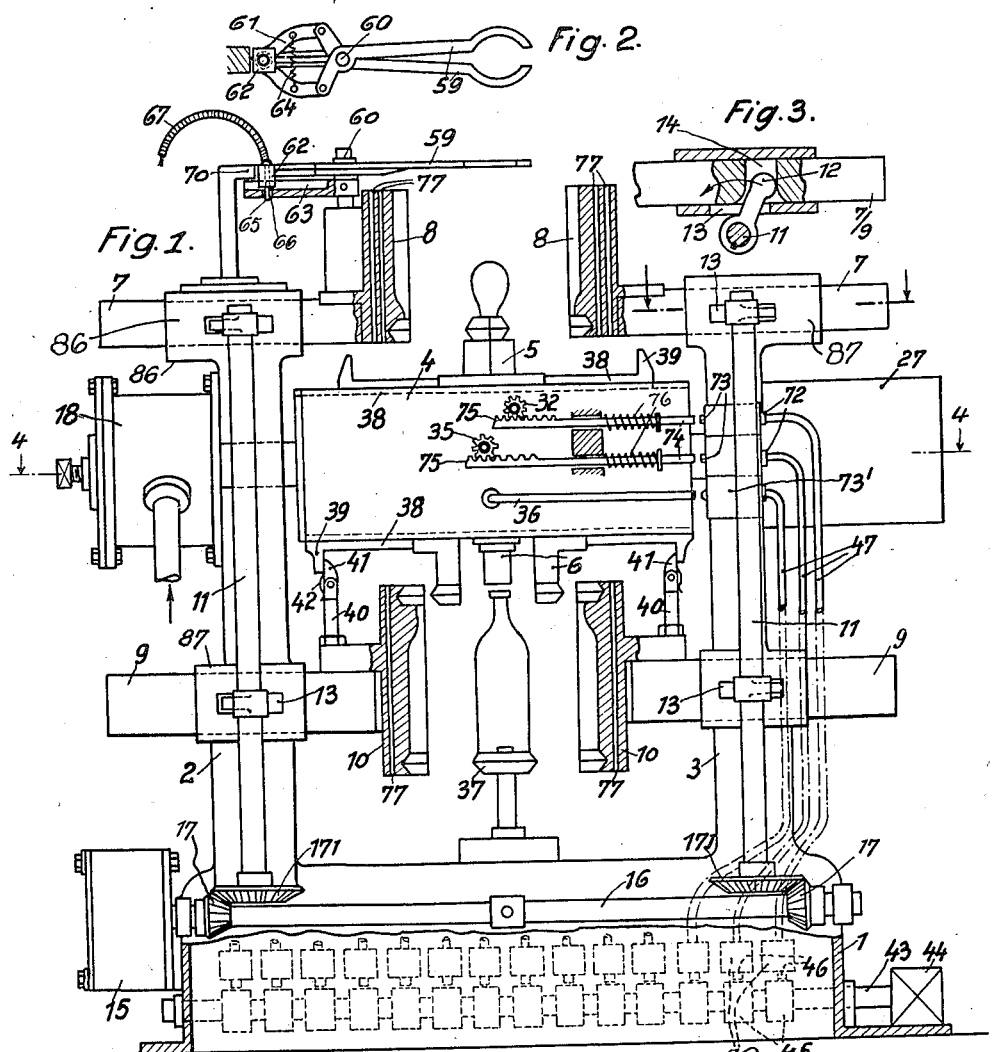
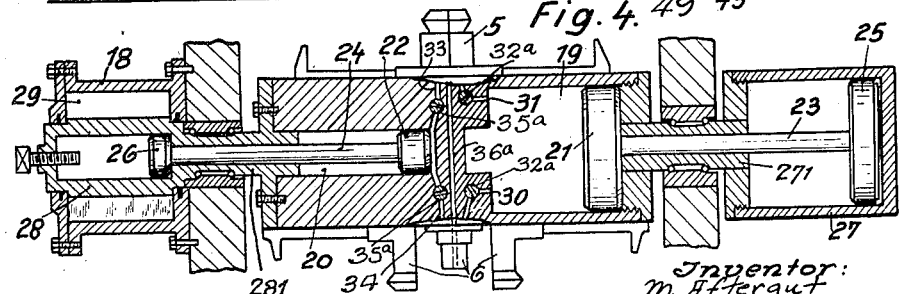

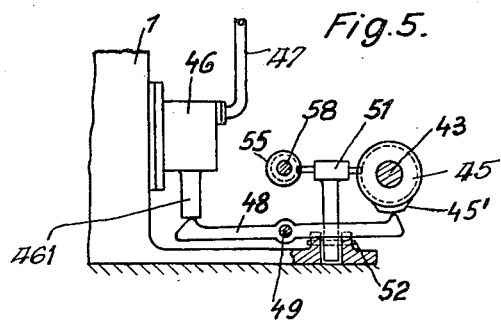
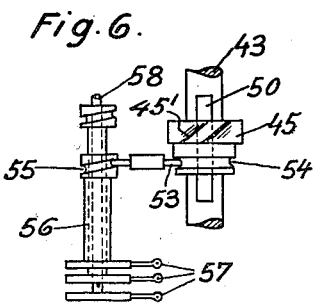
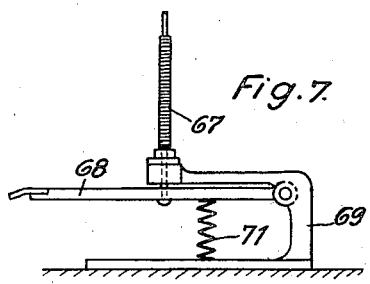
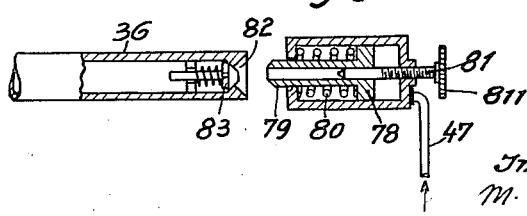

Patented Aug. 30, 1932

1,875,202

UNITED STATES PATENT OFFICE

MAX AFTERGUT, OF BERLIN-SCHONEBERG, GERMANY

AUTOMATIC GLASS-BLOWING MACHINE

Application filed March 16, 1927, Serial No. 175,888, and in Germany March 16, 1926. Renewed May 21, 1932.

My invention relates to improvements in automatic glass blowing machines, and the object of the improvements is to provide an automatic glass blowing machine in which measured amounts of air are sucked from the parison mould for drawing into the same a certain amount of glass, and in which further measured amounts of air are supplied for blowing the glass within the said parison mould, the apparatus controlling the supply of air being automatically set into the correct positions before beginning the operation of the machine. Thereby the machine is capable of automatically manufacturing the bottles, and of supplying the air necessary for gathering the exact amount of glass needed for making bottles and the like of the desired size. By thus regulating the volume of air sucked from or blown into the parison mould loss of energy is avoided, and the mass of glass can not be drawn into the parison mould or blown therein too far.

Other objects of the improvements will appear from the following description.

For the purpose of explaining the invention an example embodying the same has been shown in the accompanying drawings, in which the same letters of reference have been used in all the views to indicate corresponding parts. In said drawings, Fig. 1 is an elevation of the machine partly in section, Fig. 2 is a detail plan view showing a pair of scissors for separating the mass of glass drawn into the parison mould, Fig. 3 is a detail view partly in section showing a part of the mechanism for operating the slides carrying the parison and finishing moulds, Fig. 4 is a sectional plan view taken on the line 4—4 of Fig. 1, Fig. 5 is an elevation showing the mechanism for operating the controlling valves, Fig. 6 is a plan view of Fig. 5, Fig. 7 is an elevation showing the foot operated lever controlling the operation of the scissors, and Fig. 8 is a detail sectional view showing the joint between the pipe for supplying air to the finishing mould and the pipe controlled by the valve mechanism.

In the example shown in the figures my improved glass blowing machine consists of a base plate 1 provided at opposite sides with uprights 2 and 3. On the said uprights a beam 4 is rockingly mounted, which beam carries neck moulds 5 and 6. In guides 86 and 87 provided in the uprights 2 and 3 slides 7 for opening and closing the parison mould 8 and slides 9 for opening and closing the finishing mould 10 are mounted. At the front sides of the said uprights shafts 11, 11 are mounted which are provided with crank arms 12 engaging in slots 14 of the slides 7 and 9 and moving in slots 13 of the guides 86 and 87, and which are adapted to reciprocate the said slides.

For imparting rocking movement to the shafts 11 a compressed air motor 15 is provided the shaft 16 of which is disposed alongside the base plate 1 and carries bevel gear wheels 17 meshing with bevel gear wheels 171 keyed to the shafts 11. The beam 4 is adapted to be rocked by means of a compressed air motor 18 secured to the upright 2, a concentric cylinder 28 of the said motor being provided with blades or pistons 29, and being rigidly connected with the beam. As appears more particularly from Fig. 4, the beam 4 is made hollow at its right hand and thus providing a cylinder 19 for producing the vacuum necessary for drawing the glass into the parison mould. At its left hand part the said beam is provided with a cylindrical bore 20 providing a cylinder for supplying glass blowing air under pressure to the parison mould. Within the cylinders 19 and 20 pistons 21 and 22 are mounted the rods 23 and 24 of which are connected respectively with pistons 25 and 26, the piston 25 having reciprocating movement within a cylinder 27, and the piston 26 having reciprocating movement within the cylinder 28. The cylinder 27 is mounted in the journal 271 of the beam 4, and the cylinder 28 is mounted in the journal 281 of the said beam. Thus the cylinders 27 and 28 take part in the rocking movement of the beam. The pipes leading to the cylinders 27 and 28 for conducting compressed air to the pistons 25 and 26 pass through the trunnions of the beam 4 in the uprights 2 and 3 of the machine frame. These pipes extend from certain of the valves 46 and are controlled thereby, but to avoid complicating the disclosure they have been omitted from the drawings.

The cylinder 19 is connected by bores 30 and 31 with the neck moulds 5 and 6, suitable valves 32a being provided in the said bores for controlling the transmission of the vacuum from the cylinder to the neck moulds. In Fig. 1 I have shown a gear wheel 32 connected with one of the said valves 32a and adapted to operate the same, a similar gear wheel being provided at the opposite side of the beam. The cylinder 20 is connected by passages 33 and 34 with the neck moulds 5 and 6 for supplying air under pressure for blowing the glass. The passages 33 and 34 are likewise equipped with valves 35a, which valves are adapted to be operated by gear wheels 35 one of which has been shown in Fig. 1. The gear wheels 32 and 35 are operated by means of racks 75 suitably guided on the beam 4 and acted upon by springs 76 tending to shift the same to the right. The manner of operating the said racks will be described hereinafter. By means of the said valves connected with the gear wheels 32 and 35 the passages 30, 31, 33 and 34 alternately connect the cylinders 19 and 20 with the neck moulds 5 and 6 and with the outer air. The valves and their operating mechanisms have not been shown in detail. But it is my opinion that a skilled mechanic will have no difficulty in providing the necessary connections and mechanisms for properly operating the valves. At the opposite end of the finishing mould a table 37 is secured to a vertical rod on the base plate 1 which base plate provides the bottom for the finishing mould and a support for the finished article.

The halves of the neck moulds 5 and 6 are connected with slides 38 each of which is formed at its end with a nose 39. When the neck moulds have been rocked by the beam 4 into their lower positions the said noses are in position for engagement by arms 40. When separating the halves of the finishing mould the said arms open the neck moulds, and on return of the neck mould into its upper position the noses 39 become free of the fingers 40 the neck moulds are automatically closed by springs not shown in the figures. At their outer ends the arms 40 carry pawls 41 acted upon by springs 42. Thus, when closing the finishing mould, the pawls 41 are rocked outwardly when engaging the noses 39, so that the closing operation is not interfered with by the noses 39.

The parts of the machine are operated by compressed air supplied through pipes 47. The said pipes include controlling valves the casings 46 of which have been shown in Fig. 1 in dotted lines. The stems 461 of the said valves are adapted to be operated by cams 45 mounted on a common shaft 43 adapted to be operated by an electromotor 44. As appears from Fig. 5, the said shaft 43 is located at the rear of the base plate 1. In Fig. 1 I have shown only three pipes 47, which pipes supply compressed air confined within the hollow base plate 1 to cylinders 72 the piston rods 73 of which are adapted to operate the gear wheels 32 and 35 and to a cylinder 73'. Within the cylinders 72 pistons are mounted the rods 73 of which are adapted for engagement with the aforesaid racks 75. Thus, when forcing the piston rods 73 to the left the racks 75 impart rotary movement to the gear wheels 32 and 35 for operating the valves connected therewith. Similar pipes 47 are provided for supplying air to the compressed air motors 15 and 18 and other parts.

Compressed air for finishing the article is supplied through the pipe 36, which pipe is connected, on the one hand with the air chamber provided by the base plate 1 by the parts shown in detail in Fig. 8, and on the other hand with a passage 36a leading to the neck moulds 5 and 6. As shown in the said figure, the air supply pipe 47 is connected with a cylinder 73' mounted in the upright 3 and having a piston 78 mounted therein, a spring 80 tending to push the said piston to the right. The piston is provided with a tubular piston rod 79 having a conical end adapted for engagement with the conical face 82 of the pipe 36. Within the pipe 36 a spring pressed valve 83 is located which is adapted to be pressed inwardly for opening the pipe 36 by the tubular piston rod 79. The tubular piston rod is normally closed by a bolt 81 screwing through the right-hand head of the cylinder 73' and adapted to be set into the desired position inwardly and outwardly by means of a milled disk 811 carried thereby. Thus, when admitting compressed air to the cylinder 73' the piston 78 is first pushed to the left without permitting the delivery of air through the tubular piston rod 79, the said air being delivered only after the piston 78 has passed the inner end of the bolt 81. Now the bolt 81 is set so that the delivery of the air begins slightly before the end face of the piston rod 79 engages the conical seat 82, and the valve 83 is pushed inwardly for opening the pipe 36. Thus the loss of air is prevented. The supply of the air to the pipe 47 is controlled by one of the valves 46, and immediately after beginning the delivery of air the pipe 36 is automatically connected with the pipe 47. The flow of compressed air supplied to the finishing mould can be exactly regulated by means of the bolt 81.

The construction of the valves 46 is the same and each valve comprises a spring pressed valve cone of any known or preferred construction. In the example shown in Fig. 5 the valve stem 461 is acted upon by a lever 48 rockingly mounted at 49 and having its outer end in position for engagement by one of the cams 45. The said cams are constructed so as to permit regulation of the time of the operation of the valves, for which purpose the following mechanism is provided:

Laterally of the shaft 43 telescoping shafts 56, 58 are mounted, and each telescoping shaft has a cam disk 55 secured to its end, which cam disks correspond to circumferential grooves 54 made in the hubs of the cams 45. Between the cam disks 55 and the said hubs levers 51 are rockingly mounted at 52 which levers are provided at their top ends with pins 53 engaging in the grooves of the cam disks 55 and in the grooves 54 respectively. At their outer ends the telescoping shafts 56 and 58 carry hand levers 57 by means of which they can be rocked into the desired positions. Thus, when rocking one of the telescoping shafts the corresponding lever 51 is rocked by the cam groove 55 thus shifting the corresponding cam 45 axially of the shaft 43, the said cams being connected with the shaft by means of a feather 50 permitting longitudinal displacement of the cam on the shaft 43. As appears from Fig. 6, the cam disks 45 are provided with helical lugs 45'. Therefore, when axially shifting the said lugs the time of the operation is varied. If it is desired to provide for a variation of the length of time of the operation of the valve, the cams 45 are divided along a plane perpendicular to the axis.

For separating the mass of glass gathered by the moulds, a pair of scissors 59 is provided, which is mounted on a pivot bolt 60 carried by one of the parison mould halves 8. The rear ends of the said scissors are jointed to a slide member 62 by means of two levers 61. The said slide member is movable in a guide member 63 carried by the pivot bolt 60 on which the scissors are mounted. A spring 64 connected to the arms 61 tends to operate the scissors so as to separate the glass. By the operation of the said spring the scissors are rocked so far that their relative position is the reverse of that shown in Fig. 2. Normally the scissors are held in the position shown in the said figure by a pin 65 engaging in a slot 66 made in the guide member 63. But when retracting the said pin the scissors are rocked by the spring 64 from the position shown in Fig. 2 so as to cut the glass. For thus retracting the pin 65 a bowden cable 67 is provided, which is adapted to be operated from a foot lever 68 mounted on a bracket 69, as is shown in Fig. 7. The said foot lever may be provided at any part near the machine, and it may be mounted on the frame of the machine.

After cutting the scissors are put under tension by their rear end engaging a stop member 70 provided on the upright 2. Thereby the slide member 62 is shifted so far that the pin 65 reengages the slot 66. The foot lever 68 is normally pressed upwardly by a spring 71. The parison and finishing moulds are formed with cooling bores 77, through which air circulates, the said air rising through the said bores by being heated, or being passed therethrough by suitable means.

The operation of the machine is as follows:

At the beginning of the operation the parison mould 8 is closed above the neck mould 6, and the attendant pours a mass of glass between the scissors 59 and into the parison mould. After the desired mass of glass has been poured into the mould, the glass is cut by depressing the foot lever 68, whereupon the mass of glass is immediately taken into the mould by means of the suction cylinder 19. Thereafter the preliminary blowing begins. The taking in of the mass of glass and the preliminary blowing and the following operations are automatically performed, the succession and the duration of the steps depending exclusively on the relative position of the cams 45 and the adjusting thereof.

After preliminary blowing the parison mould 8 is opened. The beam 4 is turned about an angle of 180 degrees, whereupon the parison mould 8 and the finishing mould 10 are closed. Within the finishing mould the glass is blown into final shape, while a new mass of glass is poured into the parison mould. After completing preliminary and final blowing, the moulds are automatically opened, whereupon the final product remains on the bottom 37 of the finishing mould, from which it is removed by the attendant. Now the beam 4 and the mould carried thereby are again rocked at an angle of 180 degrees, whereupon a new operation begins. The succession of the operations is timed so that between successive operations there is sufficient time for filling the glass into the moulds and for removing the final article. In some cases means are provided for automatically performing the said operations.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. A glass blowing machine, comprising a rockable carrier, a parison mould, a finishing mould, a neck mould mounted on said carrier, two cylinders provided in said carrier and capable of connection with said parison mould, pistons within said cylinders, operating means for said pistons, means controlling the supply of air between said cylinders and parison mould, and means for rocking said carrier with its neck mould into positions for cooperation with said parison and finishing moulds.

2. A glass blowing machine, comprising a rockable carrier, a parison mould and finishing mould located at different sides of said carrier, a pair of neck moulds mounted on said carrier in positions for successive cooperation with said parison and finishing moulds, cylinders in said carrier capable of cooperation with said parison mould, pistons in said cylinders, means for operating said pistons, means for controlling the supply of air to and from said parison and finishing moulds, and means for rocking said carrier with the neck moulds into positions for cooperating with said parison and finishing moulds.

3. A glass blowing machine, comprising a rockable carrier, a neck mould mounted on said carrier, a parison mould and a finishing mould located at different sides of said carrier in positions for cooperation with said neck mould, means in said carrier for supplying fluid to and from said parison mould, valves controlling the supplying of fluid to and from said parison mould, operating means for said valves mounted on said carrier, and relatively fixed operating members for said operating means and adapted for loose operative engagement with said operating means.

4. A glass blowing machine, comprising a rockable carrier, a neck mould mounted on said carrier, a parison mould and a finishing mould located at different sides of said carrier in positions for cooperation with said neck mould, said carrier comprising a passage adapted to supply compressed fluid to said finishing mould, a relatively fixed cylinder, a piston movable in said cylinder and having a tubular rod adapted for engagement with said passage, means for supplying fluid under pressure to said cylinder, and an adjustable bolt extending into said tubular piston rod from the rear thereof.

5. A glass blowing machine, comprising a rockable carrier, a neck mould mounted on said carrier, means for supplying fluid to and from said neck mould, a parison mould and a finishing mould located at different sides of said carrier in positions for cooperation with said neck mould, a pair of scissors mounted on said parison mould in position for cutting the glass supplied to the parison mould, operating means for said pair of scissors, and means for rocking said carrier.

6. A glass blowing machine, comprising a rockable carrier, a neck mould mounted on said carrier, means for supplying fluid to and from said neck mould, a parison mould and a finishing mould located at different sides of said carrier in positions for cooperation with said neck mould, a pair of scissors mounted on said parison mould in position for cutting the glass supplied to the neck mould, a spring acting on said pair of scissors and tending to impart cutting movement thereto, a locking member normally holding the pair of scissors in position ready for cutting, means for moving said locking member out of locking position, means for setting the pair of scissors into position ready for cutting, and means for rocking said carrier.

7. A glass blowing machine, comprising a carrier, a neck mould mounted on said carrier, a parison mould and a finishing mould made in halves and located at different sides of said carrier in positions for cooperation with said neck mould, means for moving the halves of said parison and finishing moulds towards and away from each other for closing and opening the moulds, a pair of scissors movable with one of the halves of said parison moulds and located in position for cutting the glass supplied to said neck mould, a spring acting on said pair of scissors and tending to impart cutting movement thereto, locking means normally holding said scissors in position ready for cutting, means for releasing said locking means, a relatively fixed member in position for opening said scissors when opening said parison mould, and means for rocking said carrier.

8. A glass blowing machine, comprising a rockable carrier, a rocking compressed fluid motor directly connected with said carrier and adapted to impart rocking movement thereto, a neck mould mounted on said carrier, parison and finishing moulds mounted at different sides of said carrier in positions for cooperation with said neck mould, and two cylinders provided in said carrier for supplying fluid to and from said parison and finishing moulds.

9. A glass blowing machine, comprising a rockable carrier, a neck mould mounted on said carrier, a parison mould and a finishing mould located at different sides of said carrier in positions for cooperation with said neck mould, said parison and finishing moulds being made in halves, slides carrying said halves of the parison and finishing moulds, rock shafts provided with arms engaging said slides and adapted to impart mould opening and closing movement thereto, means for rocking said shafts, and means for rocking said carrier.

10. A glass blowing machine, including moulds formed with cooling passages open at both ends for the free passage of atmospheric air, and means for supplying and blowing glass in said moulds.

In testimony whereof I have signed my name to this specification.

MAX AFTERGUT.